United States Patent [19]

Bauer

[11] Patent Number: 4,943,998

[45] Date of Patent: Jul. 24, 1990

[54] INTERMESHED COMMUNICATION NETWORK

[75] Inventor: Uwe Bauer, Eckental, Fed. Rep. of Germany

[73] Assignee: U.S. Philips Corp., New York, N.Y.

[21] Appl. No.: 342,256

[22] Filed: Apr. 21, 1989

[30] Foreign Application Priority Data

Apr. 22, 1988 [DE] Fed. Rep. of Germany ....... 3813581

[51] Int. Cl.⁵ .............................................. H04M 7/00
[52] U.S. Cl. ..................................... 379/220; 379/229
[58] Field of Search ............... 379/220, 221, 112, 113, 379/229

[56] References Cited

U.S. PATENT DOCUMENTS

| | | | |
|---|---|---|---|
| 3,591,724 | 7/1971 | Yako | 379/221 X |
| 4,284,852 | 8/1981 | Szybicki et al. | 379/221 |
| 4,644,532 | 2/1987 | George et al. | 370/94 |
| 4,741,027 | 4/1988 | Maisel et al. | 379/221 |
| 4,756,019 | 7/1988 | Szybicki | 379/221 |

Primary Examiner—James L. Dwyer
Attorney, Agent, or Firm—Emmanuel J. Lobato

[57] ABSTRACT

A communication network having exchanges and groups of communication lines between the exchanges. Subscriber calls initiate forward messages over all possible groups of communication lines to search for the called party at every exchange. Each exchange includes a terminal module which is callable and capable of calling like a subscriber and which stores data about traffic and the exchange operation, and an external interface. A portable operating station can connect to the interface at any exchange of the network and call every terminal module over the communication lines to determine the network topology and condition.

3 Claims, 1 Drawing Sheet

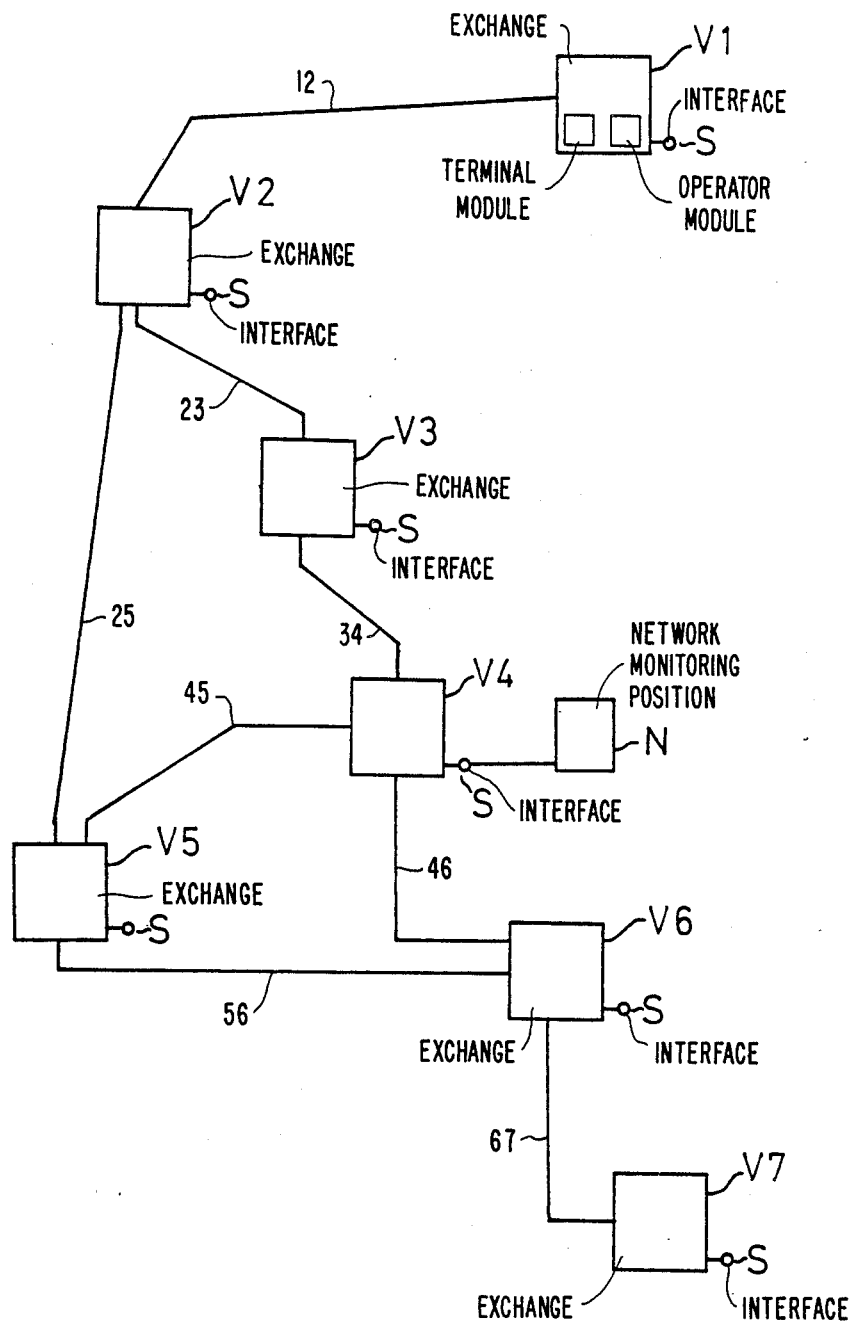

INTERMESHED COMMUNICATION NETWORK

BACKGROUND OF THE INVENTION

The invention relates to an intermeshed communication network, in which the setting up of connections between exchanges is initiated by forward messages.

Laid-open West German patent application No. DE-OS 35 11 431 and corresponding U.S. Pat. No. 4,741,027 disclose a channel selection method for an intermeshed communication network, in which exchanges are interconnected by communication lines. The setting up of connections between a calling subscriber, connected to an exchange, and a called subscriber, assigned to another exchange, is initiated by means of connection set-up messages. These messages are transmitted from the calling subscriber's exchange to all exchanges connected thereto and stored in these exchanges. In the called subscriber's exchange only the connection set-up message arriving first is used for establishing a connection to the calling subscriber station. In this way it is ensured that with an arbitrary network configuration of the intermeshed communication network the called subscriber is always found, as long as there is at least one communication path between the calling and the called subscriber. The connection set-up messages spread out in every direction from the calling subscriber to the called subscriber. On the basis of the direction in which they are spread out from the calling to the called subscriber they are designated as forward messages. On the communication path found thus a speech channel is seized sectionally from one exchange to the next and the connection is set up by means of a report-back message, which is transmitted through the found path in the opposite direction, from the called subscriber's exchange to the calling subscriber's exchange.

As a consequence of the movements of exchanges or failures of communication lines the network topology of an intermeshed communication network may change. Information about the network topology and the loads of the communication lines as well as further information of such an intermeshed communication network are summarized hereinafter under the term of network information. On the basis of this network information a network coordinator makes decisions about extensions and modifications as well as the type of exchanges and communication lines to be employed and reacts in this manner to the requirements of the communication network. The monitoring of the network is rendered difficult in that the network coordinator often changes its whereabouts for achieving these objects.

SUMMARY OF THE INVENTION

It is an object of the present invention to extend the intermeshed communication network of the type mentioned in the opening paragraph so that the communication network can be monitored in a simple manner.

This object is achieved in that each exchange comprises an interface to which a network monitoring position or station can be connected and in that each exchange comprises a connecting module in which statistical data are stored.

BRIEF DESCRIPTION OF THE DRAWINGS

An exemplary embodiment of the invention is shown by means of the drawing FIGURE and described and explained with further details.

DETAILED DESCRIPTION OF THE INVENTION

The only FIGURE shows in a diagrammatic representation an intermeshed communication network with exchanges V1 to V7, which are connected through groups of lines 12, 23 ... 67. A group of lines comprises a plurality of communication lines. One communication line out of each group of lines is designated as a signalling channel and used only for exchanging information between exchanges connected to the two ends of the line. Through this signalling channel messages are exchanged, which are used, for example, for setting up a telephone connection. Each time after a code signal used in the message, this message calls forth different reactions in the exchange where it is received. In this respect a distinction can be made between a forward message and a report-back message on the basis of the direction in which the messages are spread out. A forward message leaves through the output of the calling subscriber and spreads out wave-like as it were throughout the communication network until the called subscriber is found. In this way a communication path is established, which now allows to be directly retraced on the basis of the data conveyed in the forward message. This retracing is effected by means of a report-back message. If there is a forward message comprising the "connection set up" code, one communication line out of the group of lines is seized as a speech line or data line respectively, in sections from one exchange to the next, at the subsequent "connection set up" report-back message concurring with the report-back message returning through the signalling channel, and these lines are connected to one another by the switching networks arranged in the exchanges.

An interface S is arranged at each exchange V1 to V7. A network monitoring position or station N can be connected to each interface S, by means of which position a network coordinator can receive the required network information from any exchange of the intermeshed communication network.

In the embodiment this interface consists of a serial interface which is connected to an operator module inside the exchange. A standard personal computer comprising the proper software is linked to this serial interface as a network monitoring position or station. In this way the setting up of a network monitoring position is reduced to preparing software, which saves on hardware development costs.

Once the network monitoring position or station N is linked to the operator module over the interface S, the operator module causes the network monitoring position to be entered into a list used in the exchange, the so-called subscriber profile. This subscriber profile comprises all subscribers assigned to the exchange together with their call numbers and priorities. In this way the network monitoring position is driven like any other subscriber of the exchange and on the basis of its call number it can thus be reached from each position in the communication network.

Each exchange comprises a terminal module in which statistical data are stored. These statistical data consist of, for example, the traffic load of the groups of lines connected to this exchange and subscribers as well as the operating data of the exchange.

The traffic load of an exchange comprises, for example, the total amount of traffic arranged according to internal traffic—that is, links between subscribers of the same exchange—and external traffic—that is, links between subscribers of different exchanges—, as well as the amount of current traffic of this exchange arranged according to telephone subscribers and data terminal subscribers.

The operating data of the exchange comprise, for example, a junction number, the subscriber profile of this exchange and a line group profile of this exchange. Each exchange has its own junction number different from the junction numbers of the other exchanges. This junction number is used, similarly to the subscriber's call number, for identifying an exchange. The line group profile contains all data about each of the group lines connected to the exchange. These data include, for example, the line status (free, occupied, disturbed) and the junction number of the exchange linked to the other end of the group line.

The traffic load of a line connected to the exchange comprises, for example, details about the current amount of traffic for subscribers, subdivided into telephone subscribers and data terminal subscribers, the total number of blockings and the number of different priority levels each time from the time when the exchange was first put into operation.

Each terminal module can call and be called like any other subscriber on the basis of a specific call number. In connection with the same feature as a network monitoring position connected to the operator module, this is advantageous in that for data transmission of network information and further data between the network monitoring position and individual terminal modules or in the opposite direction, forward messages and report-back messages can be used. In this manner the arrangements of intermeshed communication networks already available for setting up telephone connections, especially the signalling channels, can be used.

By means of the connection of the network monitoring position to the operator module the network monitoring position first of all provides a picture of the network topology. For this purpose it transmits a forward message comprising the "network picture" code. This forward message is transmitted to the exchanges V3, V5, V6 linked through lines to the exchange V4. On the basis of the "network picture" code the terminal module arranged in each of these exchanges is activated. Each of these exchanges now sends new "network picture" forward messages to all the other exchanges connected thereto, except for the exchange from which the relevant forward message has come. In this manner the exchange V2 receives the forward message from the exchanges V3 and V5. It selects the forward message that answers first, whereas it ignores all further forward messages. In this way the exchange V5 ignores the forward message which is transmitted by the exchange V6. Thus, all exchanges, also those having only a single link, are reached step by step. Each forward message contains the junction number of the exchange it has been transmitted from. On the basis of the "network picture" forward message each terminal module sends back in a report-back message to the exchange designated by the junction number in the forward message the data necessary for representing the network topology. In this way the data are transferred from one exchange to the next until they reach the network monitoring position. The data necessary for making a network picture are composed of the numbering of the group lines used in each exchange, the line status and the junction numbers of the exchanges linked to these group lines. In the embodiment these data are combined such that they can be incorporated in the report-back message. Therefore, no additional line is required for transmitting these data which is in contradistinction with a telephone connection. This is advantageous in that the capacity of the group lines is not reduced when a network picture is being made.

All data arriving at the network monitoring position are processed thereby and can be plotted in a graph. With these data the network coordinator can dispose of all current network information.

In order to ensure up-to-date network pictures, the embodiment provides continuous correction of the network picture when there are changes of network topology and so on. For this purpose the terminal module arranged in each exchange monitors the groups of lines connected to the module. A failure of a group of lines can be localised, for example, by a clock drop out of the group of lines. For this purpose a clock drop out signal is used from a clock recovering circuit, which is assigned to each line group. Equally important to a network failure is excessive basic loading of a group of lines. These changes in the network contained in a "network failure" forward message are transmitted from the exchange of the relevant terminal module to the network monitoring position. The use of a forward message is specifically advantageous because the message about the network failure always arrives at the network monitoring position even if there is only a single fail-safe link between the relevant exchange and the network monitoring position. If there were a report-back message, an undisturbed transfer of these data through the last known communication link would not be guaranteed at all times. This ensures that messages about network failures reach each network monitoring position included in the network and the network picture is consequently updated continuously.

In the embodiment of the invention the operator module is arranged such that system data of the exchange can be changed by means of this module. The system data of an exchange are composed of the subscriber profile and the line group profile. The subscriber profile has to be changed, for example, for entering a new subscriber, or withdrawing a subscriber respectively, or for changing the priorities of connected subscribers and so on. For this purpose a user interface having input and output units is provided at each exchange, by means of which the authorized operating staff of one of these exchanges can make the modifications relating to the exchange concerned. With an operating mode designated as remote loading it is now possible to respond to each individual operator module of the communication network via the network monitoring position. Therefore, the link between a network monitoring position and an operator module is formed like between two subscribers. This is first effected by a "remote loading" forward message of the network monitoring position, which comprises the call number of the relevant operator module. If the operator module concerned is found, a data line is switched between the relevant operator module and the network monitoring position via a "remote loading" report-back message. Over this data line the network coordinator can then introduce changes of the system data of the relevant exchange as if he were sitting directly at the user interface of the relevant operator module. The "remote loading" mode of operation is advantageous in that an arbitrary line of the communication network can be used as a remote control line and in this way no special lines are necessary for use as remote control lines only. Thus, a better use of the communication lines available in the communication network is provided.

I claim:

1. In a communication network of the type comprising a plurality of exchanges, groups of communication lines with each group of communication lines connecting a respective pair of the exchanges for providing communication channels between subscribes at different exchanges, and wherein connection between subscribes at different exchanges is established by forward messages transmitted over all possible groups of communication lines, the improvement comprising:

each of said exchanges comprising a terminal module for storing statistical data about the traffic load of the groups of lines connected to the respective exchange and operating data of the exchange;

the respective terminal module of each of said exchanges are callable and capable of calling like a subscriber through said exchanges and communication lines of the communication network; and each of said exchanges comprise an interface for external connection to the terminal module of said exchange.

2. In a communication system according to claim 1, the improvement further comprising: a portable network monitoring station connectable to the interface of any exchange and operable for generating a forward message to establish communication between said monitoring station and the terminal module of any designate exchange within the communication network.

3. In a communication system according to claim 2, the improvement further comprising: said portable network monitoring station operable for transmitting a code to operate the respective terminal module in every exchange of the communication network to send to said portable network monitoring station data representative of the network topology of the entire communication network.

* * * * *